United States Patent Office 2,883,147
Patented Apr. 21, 1959

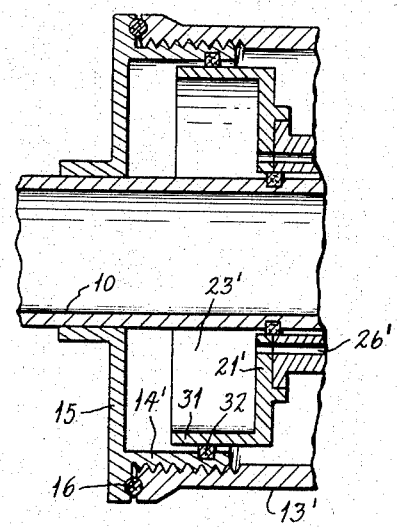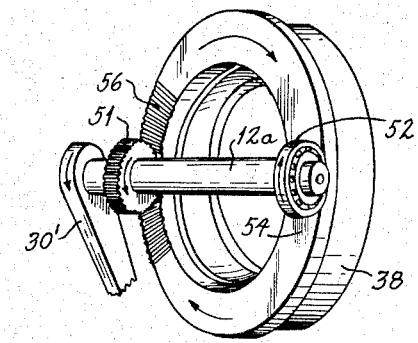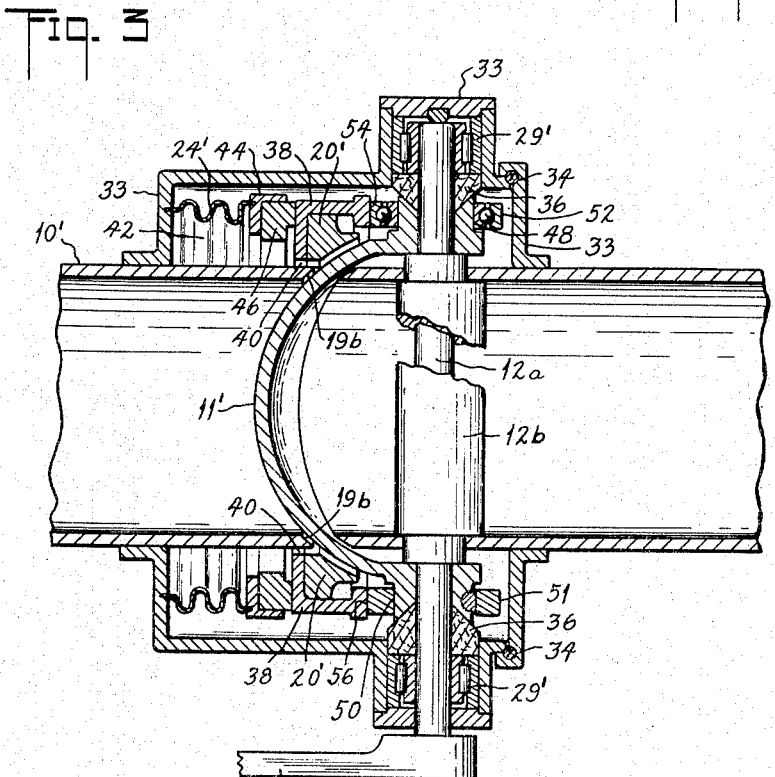

2,883,147

VALVE MECHANISM

Rio N. Mirza, Northport, and David M. Poole, Huntington, N.Y., assignors to Fairchild Engine and Airplane Corporation, Bay Shore, N.Y., a corporation of Maryland Application August 26, 1953, Serial No. 376,662

5 Claims. (Cl. 251—172)

This invention relates to valves, and has particular reference to pressure-sealed valves for controlling the flow of fluids.

Valves for controlling the flow of relatively high pressure fluids are frequently closed downstream, in the direction of flow, so as to utilize the fluid pressure to seal the valve against its seat. In consequence, considerable force is required to open the valve, and where electric or fluid pressure motors are used for that purpose, relatively large and consequently heavier power units are required to supply the necessary torque which is an important consideration in aircraft installations. Moreover, when such valves are used for controlling the flow of a fluid over wide ranges of rate of flow, such as for example, air flow that drives a turbine where a constant speed must be recovered within hundredths of a second between no load and full load conditions, conventional valves have been found to be unsatisfactory, because of the high valve-stem starting torque due to the static friction, the torque set up in the valve by the flow of air and the inertia of the parts of the valve. A possible exception is the conventional butterfly valve, since that could be so made as to have low inertia, but the peak torque on the valve stem due to the flow of the fluid increases several hundred percent of the minimum torque at different angular positions of the valve and the torques to start opening the valve are invariably high due to the static friction, particularly if the butterfly valve is designed for low leakage when closed. Another possible exception is the conventional ball valve unit which has a more uniform torque than the butterfly valve for the various angular positions of the valve, but this type of valve has both high inertia and a high starting torque due to the static friction of the valve on the seat and particularly so if the valve is designed for low leakage.

In accordance with the present invention, a valve for controlling the flow of fluids is provided, in which the initial fractional movement of the valve effects equalization or release of the flow pressure, so that the valve may be opened with low torque and little power, notwithstanding that the normal pressure drop across the closed valve may be substantial.

In a preferred embodiment of the invention, the valve comprises a segment of a hollow sphere moving about an axis located at its geometric center and extending across the fluid conduit. The valve rotates in a floating spherical seat, which is normally urged against the valve surface by the upstream fluid pressure supplied through a normally open by-pass in or carried by the valve. Upon initial movement of the valve, the by-pass is moved to a position to release the fluid pressure normally urging the seat against the valve so that the valve may be opened freely with a minimum of effort.

In a modification of the above-described preferred embodiment of the invention, the hollow spherical segment valve is mounted on a stem that rotates the valve about its geometric axis, but also moves the valve seat away from the valve and rotates the valve seat about its own axis. The two motions provide a mechanical separation of the valve and the valve seat and reduces to the absolute minimum the static friction of the valve on its seat and the torque necessary to initially open the valve. These two motions also provide a rotary-longitudinal wiping action between the valve and the seat, as the seat rotates about its axis and as the valve and the seat separate out of and come into contact with each other, respectively, at the beginning of the opening or the final closing of the valve.

It will be seen that the present invention provides a valve unit having a low overall operating torque with negligible change in torque required to move the valve at any of its positions from full closed to fully opened, as well as a minimum of seal-drag at the beginning of valve opening, a minimum of leakage when the valve is closed and a minimum of pressure drop across the valve when it is fully open.

For a more complete understanding of the present invention, reference may be had to the accompanying drawings, in which:

Fig. 3 is a fragmentary axial section through an equivalent arrangement to that shown in Fig. 1, wherein the bellows supporting the valve seat is replaced by a piston and cylinder combination;

Fig. 4 is an axial section similar to Fig. 2, and illustrating a modification of the invention; and Fig. 5 is an isometric view of the valve stem and the valve seat of the valve unit shown in Fig. 4 and the mechanism for moving the valve seat longitudinally and rotationally relative to the valve stem.

Figure 1:
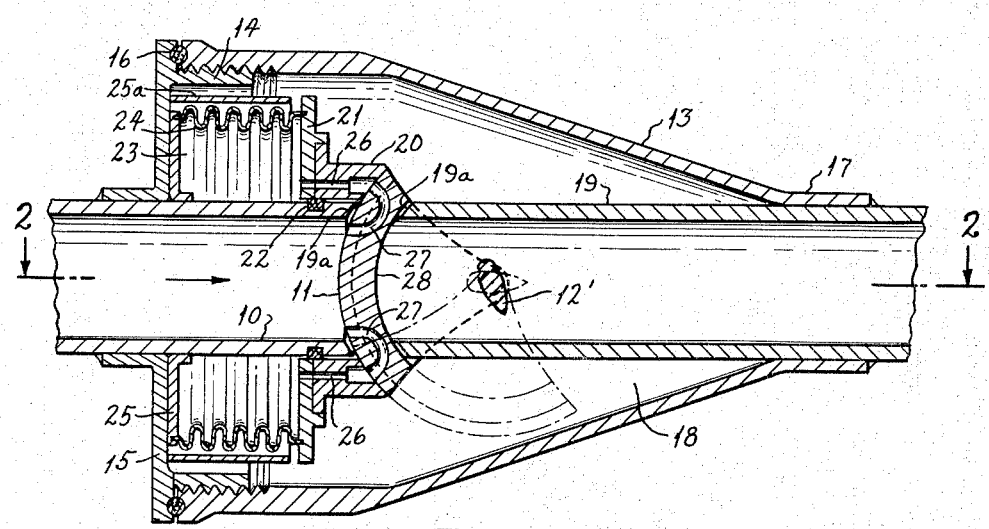
Figure 1 is an axial section through the pressure-sealed valve of this invention, as seen along the line 1—1 of Fig. 2, the solid lines showing the valve in closed position and the dotted lines in open position.
Figure 2:
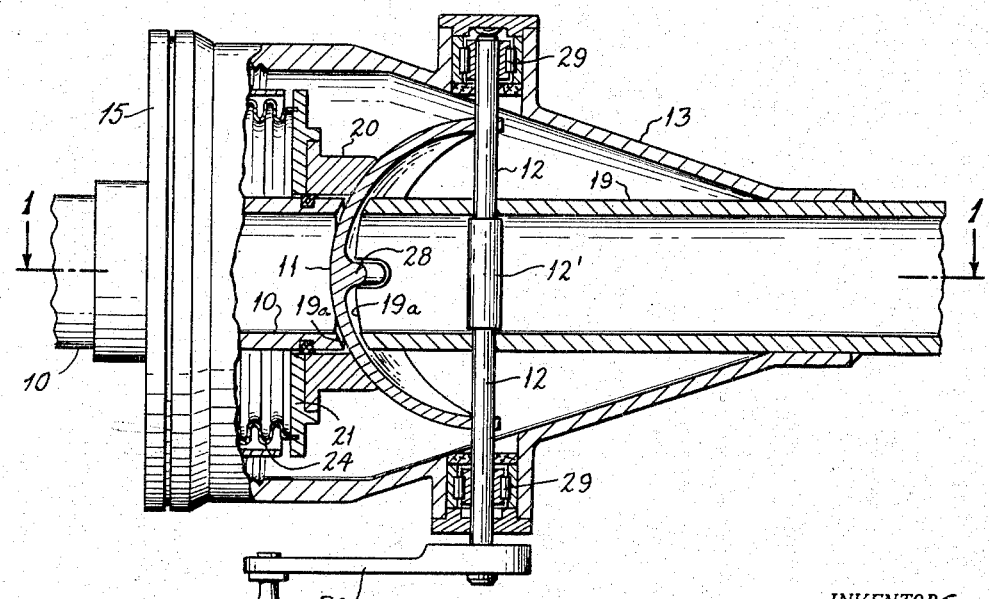
Fig. 2 is a partial axial section therethrough, as seen along the line 2—2 of Fig. 1.

Referring to Figs. 1 and 2 of the drawings, numeral 10 designates a conduit through which the pressure fluid, such as air, flows in the direction of the arrow. Extending across and normally closing the conduit 10 is valve 11 in the form of a spherical segment mounted on a shaft 12 extending across the conduit 10 and through the geometric center of the sphere of which the valve 11 is a segment. Preferably, that portion 12' of the shaft within conduit 10 has an airfoil cross-section to streamline the flow when the valve is fully open, that position being shown in dotted lines in Fig. 1.

A conical housing 13 encloses valve 11, being threaded on flange 14 of a collar 15 secured to the outer surface of conduit 10, and being sealed thereto by a gasket 16. The reduced end 17 of the conical housing 13 is welded to the outer surface of conduit portion 19, so that the interior of housing 13 forms the closed chamber 18 into which valve 11 moves to open position, an indicated by the dotted lines in Fig. 1. The housing 13 also holds in alignment the two portions of conduit 10 defining slot 19a through which valve 11 moves.

The valve seat 20, preferably formed of bronze bearing metal, carbon or the like, for low friction contact with spherical valve 11, is preferably spherical so as to have coextensive contact with valve 11. However, it has been found in practice that the surface of seat 20 which is in contact with valve 11 may be a straight-sided cone so that the differential expansion due to temperature changes continues to provide sealing due to the continuous tangential contact between conical surface of the seat 20 and the spherical surface of valve 11.

Valve seat 20 is carried by a radial disc 21 and both are slidably mounted on the conduit 10 over a sealing ring 22. Radial disc 21 forms one end of an expansion chamber 23 defined by a flexible bellows 24 sealed at one end to disc 21, and at its other end to fixed disc 25 in turn sealed to conduit 10 and abutting collar 15. A thin-walled protective sleeve 25a closely surrounds bellows 24 which expands and contracts therein.

Axial pressure-equalizing ports 26 are drilled at diametrically opposite points through valve seat 20 and disc 21 to communicate with corresponding aligned by-pass passages 27 in the valve 11 and leading from the interior of conduit 10, as shown especially in Fig. 1. By-pass passages 27 are formed by drilling through an integral diametrical rib 28 on the inner surface of valve 11, but they may be surface grooves cut in the outer surface valve 11, as is readily understood.

The ends of shaft 12 of valve 11 are journalled in bearings 29 carried by the conical housing 13 and one end of shaft 12 is fitted with a crank 30 or other means for opening and closing the valve 11 as required.

In operation of the pressure-sealed valve of this invention as shown in Figs. 1 and 2, it will be observed that valve 11 is normally sealed in closed position by line pressure connected from the upstream side through by-pass passages 27 and ports 26 to expansible chamber 23. The pressure accordingly extends bellows 24 to urge spherical valve seat 20 in an axial direction against the exterior spherical surface of valve 11.

When valve 11 is to be opened by turning crank 30, the initial movement of valve 11 disconnects by-pass passages 27 from ports 26, with the lower or leading by-pass 27 then connecting the interior of bellows chamber 23 with external chamber 18, so that pressure within bellows chamber 23 is released thereto and seat 20 is no longer urged against valve 11. The pressure in chamber 23 is further relieved by leakage therefrom into external chamber 18 as valve 11 uncovers the upper port 26, as shown in dotted lines in Fig. 1. Accordingly, valve 11 may be moved to the open position shown in Fig. 1, or any intermediate position, without drag, and in fact, with substantially torque-free movement. The fluid flows freely past open valve 11, without material retardation by shaft portion 12′ because of its streamline cross-section.

The reverse operation takes place as valve 11 is moved to the closed position shown in Fig. 1, little torque being required to do so, because there is no load or drag thereon. As by-pass passages 27 are moved into the position shown in solid lines in Fig. 1 so as to communicate with ports 26, pressure is restored therethrough to expansible chamber 23 to urge seat 20 against the spherical outer surface of valve 11 and thereby seal it, as described.

Instead of the bellows 24 shown in Figs. 1 and 2, the piston and cylinder combination shown in Fig. 3 may be used. There, the interior surface of the fixed flange 14′ serves as the cylinder and the tubular piston 31, mounted on or formed integrally with disc 21′ moving therein over sealing ring 32 and cooperating therewith to constitute the expansible chamber 23′. Operation is the same as described in connection with Figs. 1 and 2.

Referring to the modification illustrated by Figs. 4 and 5, the spherical segment valve 11′ is mounted on shaft 12a, with its fairing 12b, and is normally sealed pressure-tightly in spherical seat 20′ as previously described in connection with Figs. 1 and 2, and when the shaft is rotated in its bearings 29′ in housing 33 by crank 30′, valve 11′ moves through slot 19b in conduit 10′. The housing 33 corresponds to the conical housing 13 of Figs. 1 and 2 and is made pressure-tight to atmosphere by gasket 34 and pressure-tight with shaft 12a and valve 11′ by conical packing 36.

Piloted on conduit 10′ is L-shaped ring 38 carrying on its inner face the valve seat 20′. Ring 38 is sealed to another L-shaped ring 44 by interposed gasket 46 and ring 44 is in turn connected to one end of bellows 24′ whose other end is sealed in the inner wall of housing 33. The two L-shaped rings 38 and 44, annular slot 40, seat 20′, gasket 46, bellows 24′, housing 33, valve 11′ and conduit 10′, thus form an expansion chamber 42 into which the upstream fluid in conduit 10′ flows through slot 19b to urge seat 20′ against valve 11′.

On the portions of valve 11′ that contact shaft 12a are formed cylindrical surfaces 48 and 50, each slightly offset axially but equally from the axis of shaft 12a to be eccentric to shaft 12a. It has been found in practice that the eccentricity of the bearing 52 and the ring 51 to the axis of shaft 12a may be of the order 0.005 inches, subject to variation to suit the operating conditions found in individual installations. On eccentric surface 48 is mounted ball bearing 52, the outer surface of the outer race of which is in contact with a radial surface of L-shaped ring 38, as at 54. Keyed on eccentric surface 50 is ring 51 which is knurled, or otherwise roughened to provide a driving contact with the knurled portion of L-shaped ring 38, as at 56, shown in Fig. 5. The bellows 24′ is resilient and normally urges the valve seat 20′ into light contact with the valve 11′ and the ring 38 into engagement with the eccentric surfaces 48 and 50. In operation of this modification of the valve, when the valve unit is fully closed, the pressure of the fluid upstream the valve, acting through slots 19b and 40 and expansion chamber 42, urges L-shaped ring 38 to the right, as seen in Fig. 4, thereby forcing spherical seat 20′ tightly against valve 11′. As crank 30′ on shaft 12a is turned to open the valve, bearing 52 and ring 51 being eccentric to the shaft 12a, bodily move L-shaped ring 38 to the left as shown in Fig. 4, thus counteracting the pressure in expansion chamber 42 which originated on the upstream side of the valve through slots 19b and 40. Simultaneously, the rotation of the shaft 12a and its knurled ring 51 causes L-shaped ring 38 to rotate about its axis, thereby imparting to spherical seat 20′ a rotational movement which is superimposed on the aforementioned longitudinal movement relative to valve 11′ as the valve is opened initially. This dual movement is repeated, but in the reverse directions as the seat approaches and reaches its fully closed position. There is thus provided a rotary "wiping" action at the moment of the actual sealing of the valve and also at the moment of actual breaking of the valve seal.

Instead of releasing the pressure in expansion chamber 23 by breaking the upstream pressure through by-pass passages 26 or 26′ and 27 in the arrangement of Figs. 1, 2 and 3, or by moving the valve seat 20′ bodily to release the pressure in expansion chamber 42, as in Figs. 4 and 5, a pressure-release valve leading to the expansion chambers 23 and 42 and tripped upon initial valve-opening movement may be employed. This pressure release trip may be operated either directly by a mechanical cam or indirectly by a solenoid activated by a micro-switch for any opening movement of the valve from a fully closed position.

Although several preferred embodiments of the invention have been illustrated and described herein, it is to be understood that the invention is not limited thereby, but is susceptible of further modifications, all within the scope of the appended claims.

We claim:

1. In a valve for controlling the flow of fluid in a conduit, the combination of a curved valve, a pivot for the valve affording movement thereof about its center of curvature from a closed position across said conduit to an open position outside of said conduit, a valve seat having a surface contour conforming to the curvature of said valve, an annular member outside of said conduit and carrying said seat for movement axially of said conduit, means forming an expansion chamber positioned outside said conduit and connected to said member, and a fluid passage in said valve functioning in the opening and closing of said valve for admitting fluid into said chamber for expanding the same and urging said valve seat against said valve in sealing relation when the valve lies in closed position and for relieving the said fluid pressure in said chamber upon opening movement of said valve to facilitate further opening of said valve.

2. In a valve for controlling the flow of fluid in a conduit, the combination of a curved valve, a pivot for the valve affording movement thereof about its center of curvature from a closed position across said conduit to an open position outside of said conduit, a valve seat having a surface contour conforming to the curvature of said valve, an annular member slidably mounted on the outside of said conduit and carrying said seat for movement axially of said conduit, means including a flexible bellows disposed around the outside of the conduit and forming an expansion chamber connected to said member, and a passage in said valve for connecting with said chamber and the conduit upstream of said valve to admit fluid to said chamber for expanding the same and urging said valve seat against said valve in sealing relation when the valve is in closed position, and for discharging fluid from said chamber to relieve the fluid pressure in said chamber to facilitate opening of said valve upon movement of said valve away from said closed position.

3. In a valve for controlling the flow of fluid in a conduit, the combination of a curved valve, a pivot for the valve affording movement thereof about its center of curvature from a closed position across said conduit to an open position outside of said conduit, a valve seat having a surface contour conforming to the curvature of said valve, an annular member on the outside of said conduit and carrying said seat for movement axially of said conduit, means including a cylinder and piston forming an expansion chamber and connected to said member, a passage in said valve and connecting said conduit and said chamber to admit fluid to said chamber for expanding the same and urging said valve seat against said valve in sealing relation when the valve is in closed position and for discharging fluid from said chamber to relieve the said fluid pressure in said chamber upon movement of said valve away from said closed position to facilitate opening of said valve.

4. In a valve for controlling the flow of fluid in a conduit, the combination of a curved valve, a pivot for the valve affording movement thereof about its center of curvature from a closed position across said conduit to an open position outside of said conduit, a valve seat having a surface contour conforming to the curvature of said valve, an annular member slidably mounted on the outside of said conduit and carrying said seat for movement axially of said conduit, means forming an expansion chamber connected to said member for moving said member axially of said conduit, said seat having a passage leading to said chamber, a by-pass carried by said valve adapted to place said passage in flow communication with the inlet fluid pressure to expand said expansion chamber and urge said valve seat against said valve in sealing relation when the valve lies in closed position, and said by-pass also being adapted to vent said passage and said chamber in response to opening movement of said valve to facilitate further opening of said valve.

5. In a valve for controlling the flow of fluid in a conduit, the combination of a curved valve, a pivot for the valve affording movement thereof about its center of curvature from a closed position across said conduit to an open position outside of said conduit, a valve seat having a surface contour conforming to the curvature of said valve, said valve seat being mounted outside of said conduit for movement axially of said conduit into sealing engagement with said valve, fluid pressure responsive means disposed around the outside of said conduit for moving said valve seat axially of said conduit relative to said valve, passages in said valve and valve seat for connecting said fluid pressure responsive means to said conduit upstream of said valve when the valve is in closed position to supply fluid to said pressure responsive means for urging said valve seat against said valve in sealing relation thereto and said passages functioning in the open movement of said valve to relieve said pressure responsive means of said fluid pressure to facilitate further opening of said valve.

References Cited in the file of this patent

UNITED STATES PATENTS

| | | |
|---|---|---|
| 708,990 | Bickford | Sept. 16, 1902 |
| 712,350 | Williamson | Oct. 28, 1902 |
| 715,745 | Bickford | Dec. 16, 1902 |
| 2,214,194 | Frankley | Sept. 10, 1940 |
| 2,653,004 | Schnyder | Sept. 22, 1953 |
| 2,664,267 | Ray | Dec. 29, 1953 |

FOREIGN PATENTS

| | | |
|---|---|---|
| 268,772 | Switzerland | of 1950 |
| 674,771 | Great Britain | of 1952 |